US012783922B2

(12) United States Patent
Zick et al.

(10) Patent No.: US 12,783,922 B2
(45) Date of Patent: Nov. 3, 2026

(54) LAYOUT FOR RING OSCILLATOR-BASED ISING MACHINE SYSTEM

(71) Applicant: NORTHROP GRUMMAN SYSTEMS CORPORATION, Falls Church, VA (US)

(72) Inventors: Kenneth M. Zick, Arlington, VA (US); David George Ferguson, Takoma Park, MD (US)

(73) Assignee: Northrop Grumman Systems Corporation, Falls Church, VA (US)

(*) Notice: Subject to any disclaimer, the term of this patent is extended or adjusted under 35 U.S.C. 154(b) by 632 days.

(21) Appl. No.: 18/355,228

(22) Filed: Jul. 19, 2023

(65) Prior Publication Data

US 2025/0028987 A1 Jan. 23, 2025

(51) Int. Cl.
*G06N 7/01* (2023.01)

(52) U.S. Cl.
CPC .................................... *G06N 7/01* (2023.01)

(58) Field of Classification Search
CPC ................................ G06N 7/01; G06N 10/00
See application file for complete search history.

(56) References Cited

U.S. PATENT DOCUMENTS 5,475,344 A * 12/1995 Maneatis ................. H03K 3/03 331/25
8,130,608 B2 * 3/2012 Matsumoto .......... H03K 3/0315 369/47.48
8,195,596 B2 6/2012 Rose et al.
11,545,963 B1 1/2023 Zick
11,888,484 B2 * 1/2024 Kim ......................... H03K 5/19
2006/0294486 A1 * 12/2006 Halbutogullari ...... G06F 30/394 716/126
2014/0376557 A1 * 12/2014 Park .................. G06F 15/17381 370/400
2021/0152125 A1 * 5/2021 Chou .................. H03B 5/1228

(Continued)

OTHER PUBLICATIONS

Hao Lo et al. (Jan. 20, 2023). A 48-node all-to-all connected coupled ring oscillator ising solver chip. ResearchSquare DOI: https://doi.org/10.21203/rs.3.rs-2395566/v1.*

(Continued)

*Primary Examiner* — Peter Ludwig
(74) *Attorney, Agent, or Firm* — Renner Otto Boisselle Sklar LLP; Christopher P. Harris

(57) ABSTRACT

One example includes an Ising machine system. The system includes a plurality of ring oscillators that are each configured to propagate an oscillation signal. Each of the ring oscillators can be cross-coupled with at least one other of the ring oscillators via a respective one of the oscillation signals to provide a respective phase coupling between the respective cross-coupled ring oscillators. The system also includes an Ising machine controller configured to generate control signals corresponding to parameters of an Ising problem and including a plurality of delay selection signals. The Ising machine controller can provide at least one of the delay selection signals to each of the ring oscillators. The delay selection signal can be configured to set a variable propagation delay of the ring oscillator to control the relative phase coupling of each of the ring oscillators to each of the at least one other of the ring oscillators.

19 Claims, 6 Drawing Sheets

(56) References Cited

U.S. PATENT DOCUMENTS

| | | | | |
|---|---|---|---|---|
| 2023/0132603 A1* | 5/2023 | Kim | ........................ | G06N 10/00 331/55 |
| 2024/0022251 A1* | 1/2024 | Kim | ..................... | H03K 3/0315 |

OTHER PUBLICATIONS

Ahmed (2021) A Probabilistic Compute Fabric Based on Coupled Ring Oscillators for Solving Combinatorial Optimization Problems. IEEE.*

Clements, et al.: "An Optimal Design for Universal Multiport Interferometers"; found on the internet @ https://www.arxiv-vanity.com/papers/1603.08788/ Jul. 19, 2023.

* cited by examiner

LAYOUT FOR RING OSCILLATOR-BASED ISING MACHINE SYSTEM

TECHNICAL FIELD

The present invention relates generally to computer systems, and specifically to a layout for a ring oscillator-based Ising machine system.

BACKGROUND

Ising machines are a type of specialized computer system for solving a variety of specialty problems, known as Ising problems or non-deterministic polynomial-time hard (NP-hard) problems. One such example is the "traveling salesman problem" that is a general term for an optimization problem. Such Ising problems are evaluated on the principles of the Ising model, or the Ising problem Hamiltonian: $H(\sigma)=\Sigma h_i\sigma_i-\Sigma J_{ij}\sigma_i\sigma_j$. Such specialty Ising machines operate based on implementing a large number of variables to provide high-quality answers to certain combinatorial optimization problems extremely quickly. Typical Ising machines implement a number of elements (e.g., oscillators) that interact with other elements in the Ising machine to provide cross-coupled effects that can be implemented to solve the Ising problem based on such cross-coupled effects.

SUMMARY

One example includes an Ising machine system configured to solve an Ising problem. The system includes a plurality of ring oscillators that are each configured to propagate an oscillation signal. Each of the ring oscillators includes a plurality of coupling stages. Each of the coupling stages can have a unique phase index number within the respective one of the ring oscillators that matches the phase index numbers of the coupling stages of each of the other ring oscillators. Each of the coupling stages excepting one of each of the ring oscillators can be cross-coupled to a coupling stage having a same phase index number of one of the other ring oscillators via the oscillation signal associated with the respective ring oscillators, such that each of the ring oscillators is cross-coupled to each of the other ring oscillators at a single respective one of the coupling stages to provide a respective phase coupling between the respective cross-coupled ring oscillators.

Another example includes an Ising machine system configured to solve an Ising problem. The system includes a plurality of ring oscillators that are each configured to propagate an oscillation signal. Each of the ring oscillators includes a plurality of coupling stages. The coupling stages of a first one of the ring oscillators can be fabricated in a linear physical arrangement along a first axis of the two-dimensional array. The coupling stages associated with a second one of the ring oscillators can be fabricated in a linear physical arrangement along a second axis of the two-dimensional array orthogonal with the first axis. Each of the remaining ring oscillators can be fabricated in a physical L-shape. Each of the coupling stages can have a unique phase index number within the respective one of the ring oscillators that matches the phase index numbers of the coupling stages of each of the other ring oscillators. Each of the coupling stages excepting one of each of the ring oscillators can be cross-coupled to a coupling stage having a same phase index number of one of the other ring oscillators via the oscillation signal associated with the respective ring oscillators based on intersecting each of the other ring oscillators in the two-dimensional array, such that each of the ring oscillators is cross-coupled to each of the other ring oscillators at a single respective one of the coupling stages to provide a respective phase coupling between the respective cross-coupled ring oscillators.

Another example includes an Ising machine system configured to solve an Ising problem. The system includes a plurality of ring oscillators that are each configured to propagate an oscillation signal. Each of the ring oscillators includes a plurality of coupling stages. Each of the coupling stages can have a unique phase index number within the respective one of the ring oscillators that matches the phase index numbers of the coupling stages of each of the other ring oscillators. Each of the coupling stages excepting one of each of the ring oscillators can be cross-coupled to a coupling stage having a same phase index number of one of the other ring oscillators via the oscillation signal associated with the respective ring oscillators, such that each of the ring oscillators is cross-coupled to each of the other ring oscillators at a single respective one of the coupling stages to provide a respective phase coupling between the respective cross-coupled ring oscillators. A propagation distance of the oscillation signal between a first coupling stage having a given phase index number and a second coupling stage having a next consecutive phase index number can be equal for each of the ring oscillators.

DETAILED DESCRIPTION

Figure 1:
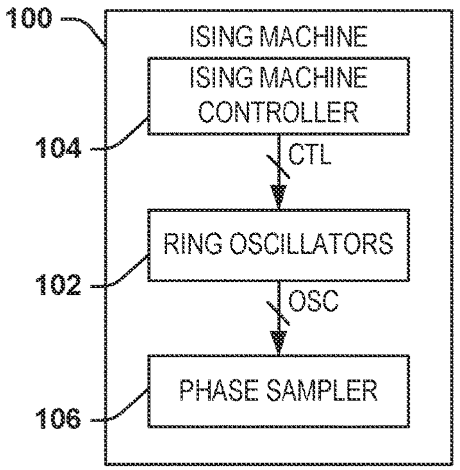
FIG. 1 illustrates an example block diagram of an Ising machine.

The present invention relates generally to computer systems, and specifically to a layout for a ring oscillator-based Ising machine system. The Ising machine system can be implemented in any of a variety of applications to solve complex Ising problems, such as optimization problems (e.g., "the traveling salesman problem"). The Ising machine system includes a plurality of ring oscillators that are each configured to propagate an oscillation signal. As an example, each of the ring oscillators can be formed from complementary metal-oxide semiconductor (CMOS) fabrication techniques including logic gates formed from CMOS, such as including application-specific integrated circuits (ASICs) and/or field-programmable gate arrays (FPGAs). The ring oscillators can each include a plurality of coupling stages that are each configured to receive an oscillation signal from one of the other ring oscillators, and can likewise provide an oscillation signal to the other ring oscillator. The oscillation signal of a given ring oscillator can affect the relative phase relationship between the respective ring oscillators. Therefore, each of the ring oscillators can be coupled to at least one other ring oscillator in a cross-coupled manner to provide a respective dynamic phase coupling between the respective ring oscillators.

The Ising machine system can also include an Ising machine controller that is configured to generate a plurality of sets of control signals that are provided to the ring oscillators. As an example, the Ising machine controller can provide a set of the control signals to each of the coupling stages of each of the ring oscillators. As an example, the control signals can include a delay selection signal that can set a variable propagation delay of the ring oscillator to control the relative dynamic phase coupling of each of the ring oscillators to each of the at least one other of the ring oscillators.

As an example, each of the ring oscillators can be fabricated the same, and can therefore include a same number of coupling stages. Each of the coupling stages in a given one of the ring oscillators can have a unique phase index number. Therefore, cross-coupling of coupling stages in separate ring oscillators can occur between coupling stages having a same phase index number in a respective pair of the ring oscillators. For example, the coupling stages can be arranged in a two-dimensional array, such that two of the ring oscillators can include coupling stages that are fabricated in linear physical arrangements that are orthogonal with respect to each other. The remaining ring oscillators can each be arranged as an L-shape with a coupling stage at the vertex. Therefore, a given one of the ring oscillators can intersect with each of the other ring oscillators in the two-dimensional array via same phase index number coupling stages, with the exception of one coupling stage of each of the ring oscillators. The oscillation signals of each of the ring oscillators can have a propagation distance between same phase index number pairs of coupling stages that are equal to provide an accurate phase relationship between the oscillation signals. Furthermore, based on the two-dimensional array arrangement of the coupling stages, the Ising machine system can be fabricated in a compact manner to provide for less latency in the oscillation signals and less power consumption, thereby providing for a more efficient design that can solve an Ising problem more rapidly.

FIG. 1 illustrates an example block diagram of an Ising machine system 100. The Ising machine system 100 can be implemented in any of a variety of specialty computing environments to solve an Ising problem that requires evaluation of a large number of variables. As an example, the Ising machine system 100 can be implemented to solve a complex optimization problem (e.g., "the traveling salesman problem").

The Ising machine system 100 includes a plurality of ring oscillators 102 and an Ising machine controller 104. The ring oscillators 102 can be implemented as any of a variety of different types of ring oscillators. As an example, the ring oscillators 102 can be formed from complementary metal-oxide semiconductor (CMOS) fabrication techniques including logic gates formed from CMOS, such as including application-specific integrated circuits (ASICs) and/or field-programmable gate arrays (FPGAs). Each of the ring oscillators 102 can thus propagate an oscillation signal, demonstrated in the example of FIG. 1 generally as a set of oscillation signals OSC. As an example, each of the ring oscillators 102 can be cross-coupled to another one of the ring oscillators 102 via the respective oscillation signals OSC, such as to provide dynamic phase coupling between the respective cross-coupled ring oscillators 102.

As described herein, the term "phase coupling" refers to the phase characteristic of a given one of the ring oscillators 102 being dependent on the phase characteristic of another one of the ring oscillators 102. As an example, the phase coupling can include a tendency toward phase alignment or phase anti-alignment between the respective oscillation signals OSC of cross-coupled ring oscillators 102. As also described herein, the phase coupling is referred to as dynamic because the Ising machine system 100 operates in a substantially constantly changing manner with respect to the phase relationships between the ring oscillators. As an example, the ring oscillators 102 can be controlled by a variety of control signals, such as delay selection signals that can control an amount of delay of the oscillations of a given ring oscillator, and therefore an oscillation period of the given ring oscillator. As described herein, the term "oscillation period" refers to a total time of a given node of the respective ring oscillator to change from a first logic state to a second logic state, and to change from the second logic state back to the first logic state. For example, the ring oscillators 102 can be fabricated to provide an odd number of logical inversions around a complete revolution.

As an example, each of the ring oscillators 102 can be fabricated approximately the same, and can therefore each include a same number of coupling stages. Each of the coupling stages in a given one of the ring oscillators 102 can have a unique phase index number that can correspond to a matching phase index number of another ring oscillator 102 to which the respective ring oscillator 102 is cross-coupled. Therefore, cross-coupling of coupling stages in separate ring oscillators 102 can occur between coupling stages having a same phase index number in a respective pair of the ring oscillators 102.

For example, the coupling stages can be arranged in a two-dimensional array. As an example, at least two of the ring oscillators 102 can include coupling stages that are fabricated in linear physical arrangements that are orthogonal with respect to each other, such that the respective two ring oscillators intersect at a cross-coupled set of coupling stages having the same phase index number. The remaining ring oscillators 102 can each be arranged as an L-shape with a coupling stage at the vertex. As described herein the term "L-shaped" refers to an arrangement in which the ring oscillator 102 has to portions that extend orthogonally from a vertex, with a coupling stage arranged at the vertex. However, it will be appreciated that the legs of the L-shaped ring oscillator 102 can have the same or different lengths with respect to each other. Moreover, while the legs of the L-shaped ring oscillator 102 are described as extending approximately orthogonal to one another, the legs could alternatively extend transverse to one another so as to define an acute or obtuse angle therebetween.

Therefore, based on the remaining ring oscillators 102 being arranged as L-shaped, a given one of the ring oscillators 102 can intersect with each of the other ring oscillators 102 in the two-dimensional array via same phase index number coupling stages, with the exception of one coupling stage of each of the ring oscillators 102. For example, the coupling stage at the vertex of each of the L-shaped ring oscillators 102 and the coupling stage at one end of the linear ring oscillators 102 can be uncoupled to any other coupling stage. As an example, each of the uncoupled coupling stages can have a phase index number that is unique among the ring oscillators 102.

In the example of FIG. 1, the Ising machine controller 104 is configured to provide a plurality of control signals, demonstrated as "CTL", to the ring oscillators 102. As an example, the control signals CTL can be provided as sets to each of the ring oscillators 102, such that the control signals CTL correspond to parameters of an Ising problem to be solved by the Ising machine system 100. As an example, the control signals CTL can include a delay selection signal that is provided to each of the ring oscillators 102. As another example, a distinct delay selection signal can be provided to each of the coupling stages of each of the ring oscillators 102, such that the net oscillation period of each of the ring oscillators 102 at a given instant can be set based on the collective contribution of each of the delay selection signals provided to each of the respective coupling stages of a given ring oscillator 102. The control signals CTL can include additional signals, as well, such as selective enablement of phase coupling of the coupling to other ring oscillator(s) 102 and/or selectively providing reference clocks and/or simulated noise signals to the coupling stages for phase alignment to the reference clocks and/or simulated noise signals.

As an example, the variable delay of each of the coupling stages of each of the ring oscillators 102, as set by the delay selection signal, can provide a variable strength or weight to the cross-coupling between respective ring oscillators 102. The Ising machine system 100 further includes a phase sampler 106. The phase sampler 106 can be configured to monitor a logic state of each of the oscillation signals of each of the ring oscillators 102 to facilitate solutions for a given Ising problem. For example, to provide a solution for a given Ising problem, the Ising machine system 100 can operate for a duration of time (e.g., as determined by any of a variety of machine parameters or other circumstances, such as empirical observations and/or real-time constraints), and the phases of the ring oscillators 102 can be sampled by the phase sampler 106 (e.g., via the oscillation signals OSC). The sampled phases of the ring oscillators 102 can be read by the phase sampler 106 as a set of data that can represent a solution to the Ising problem. The manner in which the variable delay can be set for each of the coupling stages of the ring oscillators 102 can be provided in a variety of ways, such as described in U.S. Pat. No. 11,545,963 incorporated in its entirety herein by reference.

Based on the two-dimensional array arrangement of the coupling stages of the ring oscillators 102, the Ising machine system 100 can be fabricated in a compact manner to provide for less latency in the oscillation signals and less power consumption of the Ising machine system 100. For example, the oscillation signals of each of the ring oscillators 102 can have a propagation distance between same phase index number pairs of coupling stages between the ring oscillators 102 that are equal to provide an accurate phase relationship between the oscillation signals. Therefore, the ring oscillators 102 can have an approximately equal Manhattan distance between any two the phase index number coupling stages with respect to each other. Accordingly, the compact design of the Ising machine system 100 can provide for a more efficient design that can solve an Ising problem more rapidly and with less power consumption.

Figure 2:
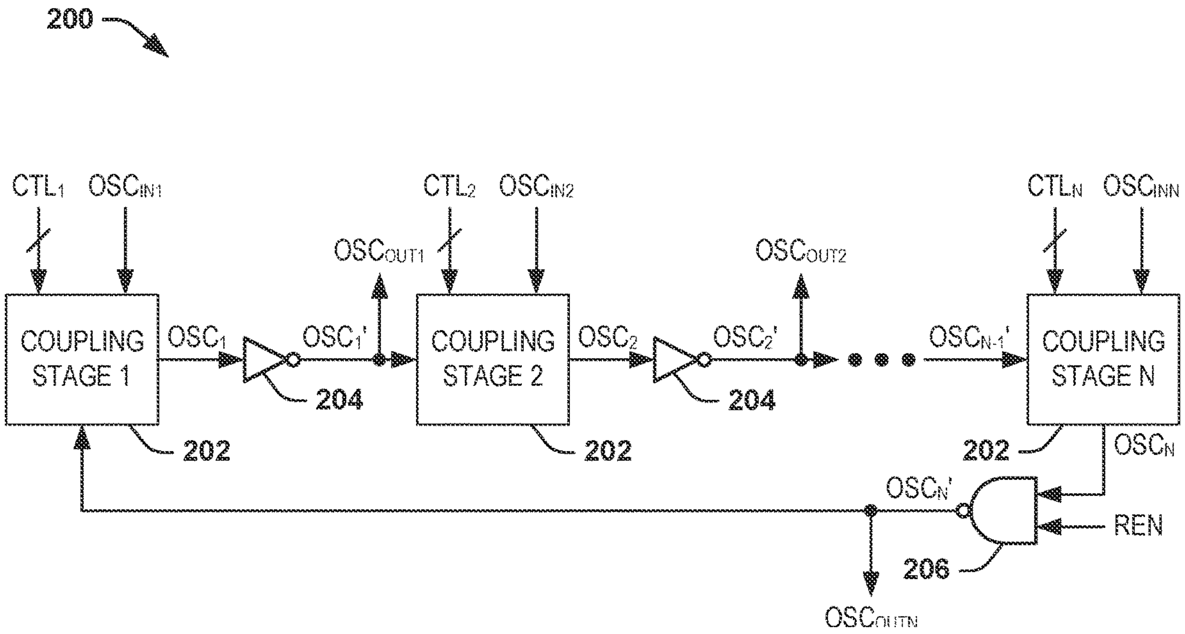
FIG. 2 illustrates an example diagram of a ring oscillator.

FIG. 2 illustrates an example diagram of a ring oscillator 200. The ring oscillator 200 can correspond to one of the ring oscillators 102 in the example of FIG. 1. Therefore, reference is to be made to the example of FIG. 1 in the following description of the example of FIG. 2.

The ring oscillator 200 includes a plurality N of coupling stages 202, where N is a positive integer. The coupling stages 202 are each interconnected by an inverter 204, which can be implemented as a CMOS inverter (e.g., with complementary pull-up and pull-down transistor switches). The ring oscillator 200 is configured to propagate an oscillation signal OSC. As an example, N can be an odd integer, such that the oscillation signal OSC exhibits an odd number of logical inversions around a complete revolution of the ring oscillator 200.

In the example of FIG. 2 as oscillation signals $OSC_1$ through $OSC_N$ provided from the coupling stages 202, and as oscillation signals $OSC_1'$ through $OSC_N'$ as provided from the inverters 204. Thus, a given Yth oscillation signal $OSC_Y'$ corresponds to an inverted version of the respective Yth oscillation signal $OSC_Y$. Furthermore, a given Yth oscillation signal $OSC_Y$ provided from the Yth coupling stage 202 corresponds to the oscillation signal $OSC_{Y-1}'$ that is provided as an input to the respective Yth coupling stage 202. As an example, the coupling stages 202 can provide a variable propagation delay of the oscillation signal $OSC_{Y-1}'$ to provide the oscillation signal $OSC_Y$.

Additionally, each of the coupling stages 202 is demonstrated as receiving a set of control signals CTL, demonstrated as $CTL_1$ through $CTL_N$. The control signals CTL can correspond to or include a set of the control signals CTL provided from the Ising machine controller 104. As described above, the control signals CTL can include a delay selection signal that can affect a propagation delay of the oscillator signal OSC through the coupling stage 202. The delay selection signal can thus affect an amount of delay between the oscillation signal $OSC_{Y-1}'$ and the oscillation signal $OSC_Y$, and thus the amount of propagation delay of the oscillation signal OSC through the respective one of the coupling stages 202. As also described above, the control signals CTL can include a variety of additional signals for controlling operation of each of the coupling stages 202, and thus the ring oscillator 200. Therefore, the control signals CTL can likewise include a variety of additional signals for controlling operation of each of the coupling stages 202, and thus the ring oscillator 200.

In the example of FIG. 2, the oscillation signals $OSC_1'$ through $OSC_N'$ provided from the respective coupling stages 202 (e.g., via the inverters 204) are provided as output oscillation signals $OSC_{OUT1}$ through $OSC_{OUTN}$. Additionally, in the example of FIG. 2, each of the coupling stages is also demonstrated as receiving an input oscillator signal OSCIN from another ring oscillator 102, demonstrated as OSCIN1 through OSCINN. In the example of FIG. 2, each of the coupling stages 202 can be numbered based on a unique phase index number, and thus numbered “1” through “N”. The oscillator signal OSCIN that is provided to a given one of the coupling stages 202 can thus correspond to an oscillator signal OSCOUT that is provided from a coupling stage having the same phase index number in a different ring oscillator 102. Similarly, the oscillator signal OSCOUT that is provided from a given coupling stage 202 of the ring oscillator 200 is provided to a coupling stage having the same phase index number in a different ring oscillator 102. The oscillator signals OSCIN and OSCOUT can thus provide the cross-coupling of a given one of the coupling stages 202 to a coupling stage of a different ring oscillator 102. As an example, the coupling stages 202 can all be cross-coupled to different ring oscillators 102, and as described in greater detail herein, one of the coupling stages 202 can be uncoupled (not cross-coupled) to any other coupling stage of another ring oscillator.

In addition, in the example of FIG. 2, the ring oscillator 200 includes a NAND gate 206 that interconnects the Nth coupling stage 202 and the first coupling stage 202. The NAND gate 206 receives the oscillation signal $OSC_N$ at a first input, and also receives a ring oscillator enable signal REN at a second input. The ring oscillator enable signal REN can correspond to an enable signal for the entire ring oscillator 200, such that the ring oscillator 200 can be selectively enabled and disabled with respect to propagating the oscillation signal OSC. As an example, the ring oscillator enable signal REN can be provided as one of the control signals CTL that is provided from the Ising machine control system 104 to the ring oscillator 200. Therefore, in response to assertion of the ring oscillator enable signal REN, the ring oscillator 200 can provide the oscillation signal OSC as described herein. However, in response to de-assertion of the ring oscillator enable signal REN, the ring oscillator 200 can be disabled, such that the oscillation signal OSC ceases propagation (e.g., maintains a static logic state between each of the coupling stages 202).

Figure 3:
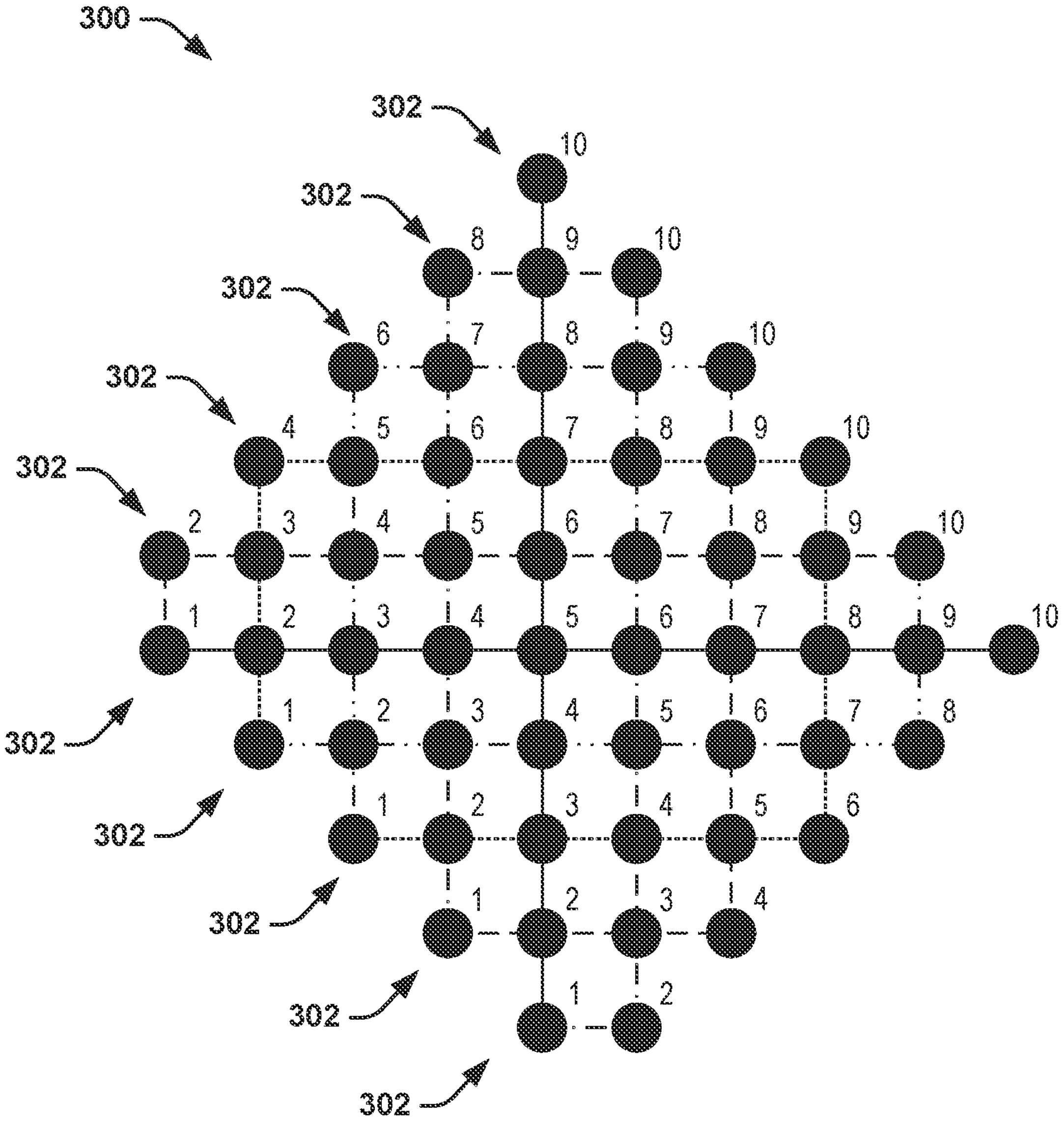
FIG. 3 illustrates an example of an Ising machine coupling network.

FIG. 3 illustrates an example of an Ising machine coupling network 300. The Ising machine coupling network 300 can correspond to a portion of the Ising machine system 100 in the example of FIG. 1. As described in the example of FIG. 3, the Ising machine coupling network 300 includes ring oscillators, such as the ring oscillator 200 in the example of FIG. 2. Therefore, reference is to be made to the examples of FIGS. 1 and 2 in the following description of the example of FIG. 3.

The Ising machine coupling network 300 includes a plurality of control stages 302 that are fabricated in a two-dimensional array. The control stages 302 are arranged in rows and columns, demonstrated as rows 304, 306, 308, 310, 312, 314, 316, 318, 320, and 322, and columns 324, 326, 328, 330, 332, 334, 336, 338, 340, and 342. Each of the control stages 302 includes a phase index number associated with it, numbered 1 through 10 in the example of FIG. 3. As described in greater detail herein, most of the control stages 302 can represent a pair of control stages 302 that are each included in a different ring oscillator.

In the example of FIG. 3, the ring oscillators are represented by lines that connect the coupling stages 302, with the lines being solid, dotted, dashed, dotted and dashed, and double dotted and dashed to represent different ring oscillators, and thus the oscillator signals that propagate around a given ring oscillator. In the example of FIG. 3, the Ising machine coupling network 300 includes a quantity ten of different ring oscillators, such that each type of line is duplicated once to demonstrate two different ring oscillators. Each of the ring oscillators begins at a coupling stage having phase index number "1" and connects along coupling stages having consecutive phase index numbers to a tenth and final coupling stage having phase index number "10". In the example of FIG. 3, each of the ring oscillators therefore intersects a different one of the ring oscillators at each of the coupling stages 302 having a same phase index number excepting one. Therefore, the coupling stage 302 at each intersection of two ring oscillators therefore corresponds to two coupling stages 302, one for each of the two respective ring oscillators. As an example, the coupling stages 302 at a given intersection of two ring oscillators can be fabricated together to minimize interconnection of the oscillator signals for the cross-coupling between the respective ring oscillators.

Therefore, the Ising machine coupling network 300 demonstrates a set of X ring oscillators that each have X coupling stages 302 and which are each cross-coupled to the remaining X-1 ring oscillators. While X is demonstrated in the example of FIG. 3 as a quantity ten, X can be any quantity greater than one. In the example of FIG. 3, the two-dimensional array of the coupling stages 302 includes a first ring oscillator that has a coupling stage 302 with a phase index number of "1" at the row 320 and the column 332. The first ring oscillator extends linearly with respect to the coupling stages 302 in a first direction (vertically in the example of FIG. 3) to the coupling stage 302 with a phase index number of "10" at the row 304 and the column 332. The two-dimensional array of the coupling stages 302 includes a second ring oscillator that has a coupling stage 302 with a phase index number of "1" at the row 314 and the column 324. The first ring oscillator extends linearly with respect to the coupling stages 302 in a second direction (horizontally in the example of FIG. 3) orthogonal to the first direction to the coupling stage 302 with a phase index number of "10" at the row 314 and the column 342.

The remaining ring oscillators of the Ising machine coupling network 300 are fabricated in an L-shape, such that each of the ring oscillators intersects, and therefore is cross-coupled with, each of the other ring oscillators at a respective same phase index number coupling stage 302. Therefore, each of the ring oscillators is cross-coupled with each of the other ring oscillators to provide dynamic phase coupling with each of the other ring oscillators. In order to provide a proper phase relationship with each of the other ring oscillators, each of the ring oscillators can have an approximately equal propagation length about an entirety of the loop formed by the respective ring oscillators, from a given one of the coupling stages 302 through all of the other coupling stages 302 and back to the given one of the coupling stages 302. For example, the oscillation signals of each of the ring oscillators in the Ising machine coupling network 300 can have a propagation distance between same phase index number pairs of coupling stages between the ring oscillators in the Ising machine coupling network 300 that are equal to provide an accurate phase relationship between the oscillation signals. Therefore, the ring oscillators in the Ising machine coupling network 300 can have an approximately equal Manhattan distance between any two the phase index number coupling stages with respect to each other.

Figure 4:
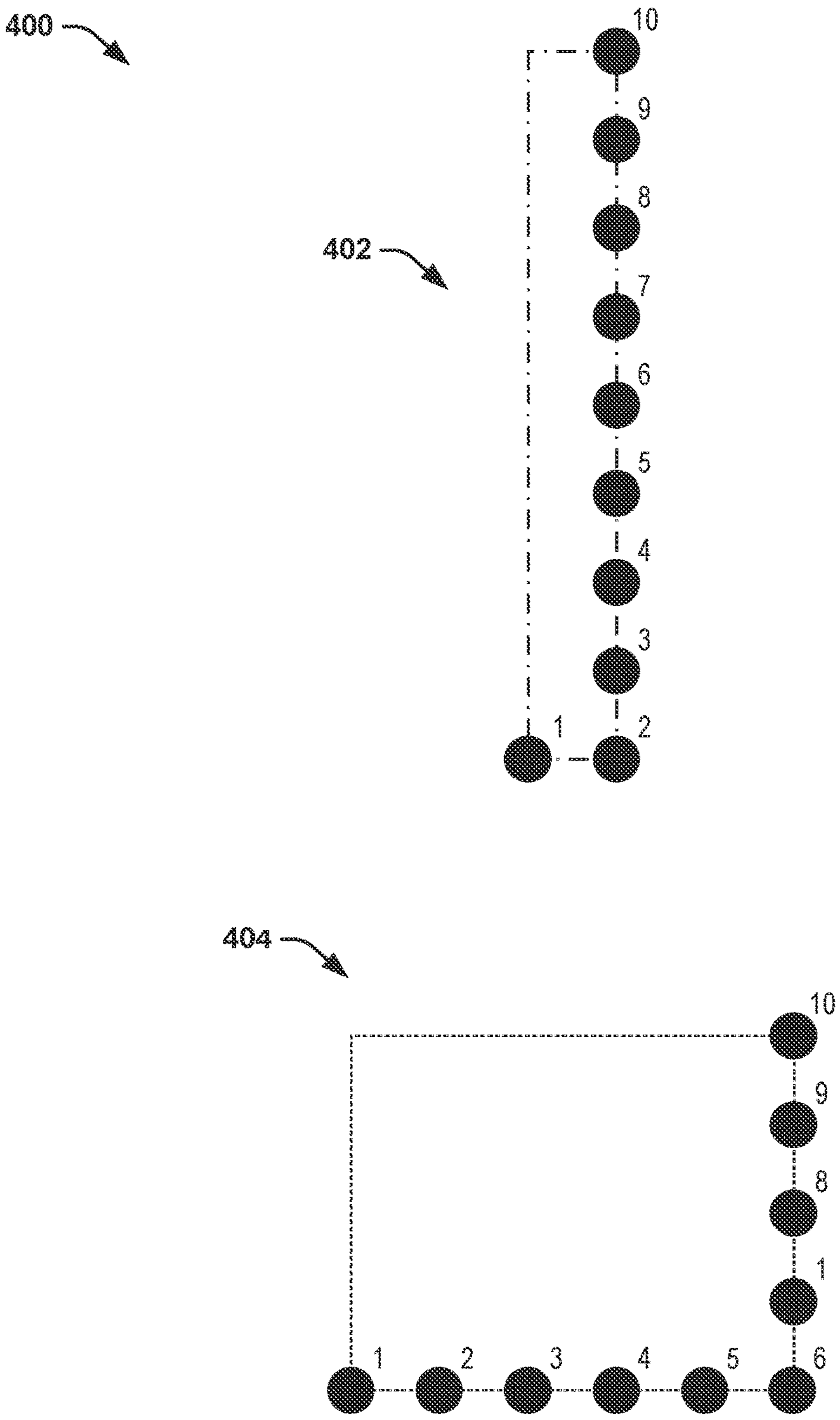
FIG. 4 illustrates an example diagram of ring oscillators.

FIG. 4 illustrates an example diagram 400 of ring oscillators. The ring oscillators are demonstrated in the example of FIG. 4 as a first ring oscillator 402 and a second ring oscillator 404. The first and second ring oscillators 402 and 404 can correspond to two of the ring oscillators in the Ising machine coupling network 300 in the example of FIG. 3. Particularly, the first ring oscillator 402 can correspond to the ring oscillator in the example of FIG. 3 that has a coupling stage 302 with a phase index number of "1" at the row 322 and the column 332. The first ring oscillator 402 extends in a first direction along a first leg of the L-shape to a coupling stage with a phase index number of "2" at the vertex at the row 322 and the column 334, then extends in a second direction orthogonal to the first direction along a second leg of the L-shape to a coupling stage with a phase index number of "10" at the row 306 and the column 334. The first ring oscillator 402 also includes a return path for the oscillation signal that couples the coupling stage with the phase index number of "10" back to the coupling stage with the phase index number of "1". With additional reference to the example of FIG. 3, the first ring oscillator 402 can thus intersect, and therefore cross-couple to, each of the other ring oscillators at each of the coupling stages 302 at separate respective phase index numbers, with the exception of the coupling stage at phase index number "2" at the vertex of the L-shape.

The second ring oscillator 404 can correspond to the ring oscillator in the example of FIG. 3 that has a coupling stage 302 with a phase index number of "1" at the row 318 and the column 328. The second ring oscillator 404 extends in a first direction along a first leg of the L-shape to a coupling stage with a phase index number of "6" at the vertex at the row 318 and the column 338, then extends in a second direction orthogonal to the first direction along a second leg of the L-shape to a coupling stage with a phase index number of "10" at the row 310 and the column 338. The second ring oscillator 404 also includes a return path for the oscillation signal that couples the coupling stage with the phase index number of "10" back to the coupling stage with the phase index number of "1". With additional reference to the example of FIG. 3, the second ring oscillator 404 can thus intersect, and therefore cross-couple to, each of the other ring oscillators at each of the coupling stages 302 at separate respective phase index numbers, with the exception of the coupling stage at phase index number "6" at the vertex of the L-shape. The second ring oscillator 404 can thus intersect the first ring oscillator 402 at the respective coupling stages having the phase index number "4" at the row 318 and at the column 334 that is common to both of the first and second ring oscillators 402 and 404.

The first and second ring oscillators 402 and 404 can have approximately equal distance with respect to a round trip of the oscillation signal in each of the first and second ring oscillators 402 and 404, which can thus be the same as the distance as the rest of the ring oscillators in the Ising machine coupling network 300 in the example of FIG. 3. Therefore, the ring oscillators of the Ising machine coupling network 300 can provide accurate nominal phase relationships between the respective oscillation signals in solving a given Ising problem. As demonstrated in the example of FIG. 3, the Ising machine coupling network 300 includes ten ring oscillators, but the design principles described herein can be expanded to provide for a much larger Ising machine that includes dozens, scores, or more ring oscillators, as described in greater detail herein. Additionally, the Ising machine coupling network 300 can be fabricated in a CMOS fabrication process. However, a similar Ising machine can be fabricated using a column-based FPGA implementation, as described in the example of FIG. 5.

Figure 5:
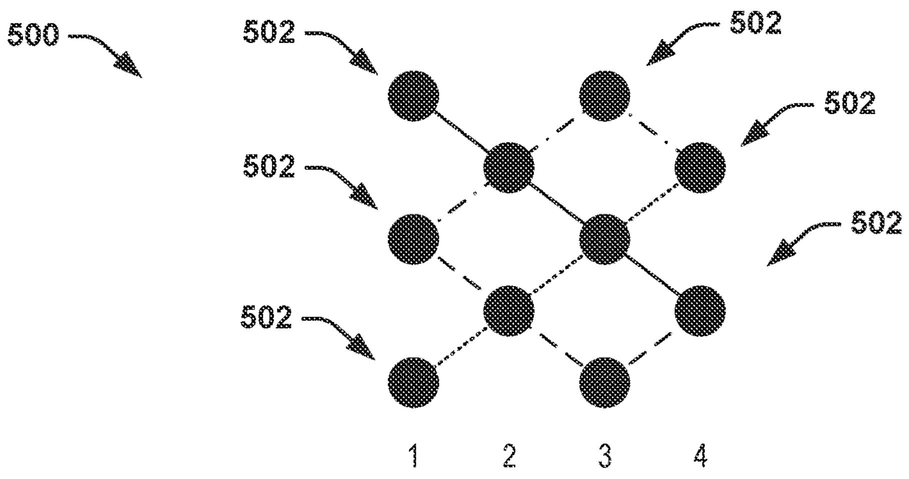
FIG. 5 illustrates another example of an Ising machine coupling network.

FIG. 5 illustrates another example of an Ising machine coupling network 500. The Ising machine coupling network 500 can correspond to a portion of the Ising machine system 100 in the example of FIG. 1. As described in the example of FIG. 5, the Ising machine coupling network 500 includes ring oscillators, such as the ring oscillator 200 in the example of FIG. 2. Therefore, reference is to be made to the examples of FIGS. 1 and 2 in the following description of the example of FIG. 5. As described in the example of FIG. 5, the Ising machine coupling network 500 can be implemented using a column-based CMOS FPGA.

In the example of FIG. 3, the ring oscillators are represented by lines that connect the coupling stages 502, with the lines being solid, dotted, dashed, and dotted and dashed to represent different ring oscillators, and thus the oscillator signals that propagate around a given ring oscillator. In the example of FIG. 5, the Ising machine coupling network 500 includes a quantity four of different ring oscillators. Each of the ring oscillators begins at a coupling stage 502 having phase index number "1" and connects along coupling stages having consecutive phase index numbers to a tenth and final coupling stage having phase index number "4". In the example of FIG. 5, the coupling stages 502 are provided in columns that each correspond to a respective one of the phase index numbers. Therefore, each of the ring oscillators therefore intersects a different one of the ring oscillators at each of the coupling stages having a same phase index number excepting one. As a result, the coupling stage 502 at each intersection of two ring oscillators therefore corresponds to two coupling stages 502, one for each of the two respective ring oscillators. As an example, the coupling stages 502 at a given intersection of two ring oscillators can be fabricated together to minimize interconnection of the oscillator signals for the cross-coupling between the respective ring oscillators.

The Ising machine coupling network 500 can thus operate in the same manner as described above regarding the Ising machine 300 in the example of FIG. 3. The Ising machine coupling network 500 thus represents an alternative implementation to the Ising machine 300 demonstrated in the example of FIG. 3. The Ising machine coupling network 500 can be expanded to include a significantly greater number of ring oscillators, and thus an increasing quantity of coupling stages having respective phase index numbers.

Figure 6:
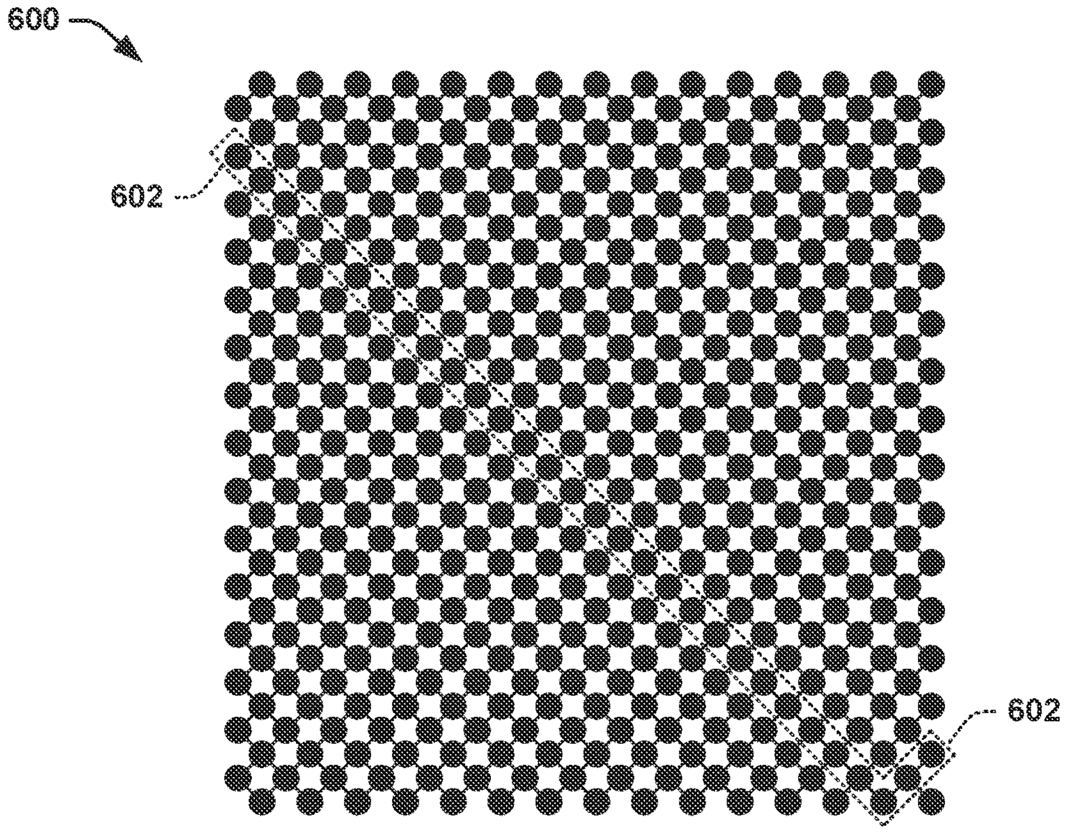
FIG. 6 illustrates another example of an Ising machine coupling network.

As described above, the design principles described herein can be expanded to provide for a much larger Ising machine that includes dozens, scores, or more ring oscillators. FIG. 6 illustrates another example of an Ising machine coupling network 600. The Ising machine coupling network 600 is fabricated to a significantly large number Y of ring oscillators in the two-dimensional array, with each ring oscillator including Y coupling stages. Similar to as described above in the example of FIG. 3, each of the ring oscillators can be cross-coupled to each of the other ring oscillators at a same phase index number. Such a large number of ring oscillators can provide for calculation of a significantly more complicated Ising problem. However, because each ring oscillator is configured to propagate only a single oscillation signal, the amount of delay between a determination of the phase relationship between each oscillation signal with an oscillation signal of another ring oscillator can be significant based on the amount of time it takes for each oscillation signal to provide a round trip around each of the respective ring oscillators.

For example, in the example of FIG. 6, one of the ring oscillators is outlined by a dotted line at 602. The ring oscillator 602, like all other ring oscillators in the Ising machine coupling network 600, includes thirty coupling stages, which can result in a significant amount of time for the oscillation signal to propagate a single revolution about the ring oscillator 602, and thus can provide a significant amount of time for the solution of an Ising problem based on the phase relationship of the ring oscillator 602 with each of the other ring oscillators. Therefore, while the Ising machine design principles described herein can provide for a significantly more efficient solution to an Ising problem based on reduced latency of the oscillation signal between coupling stages and associated reduced power consumption, expanding the quantity of ring oscillators to a significantly larger Ising machine, absent other modifications, can result in diminishing returns.

Figure 7:
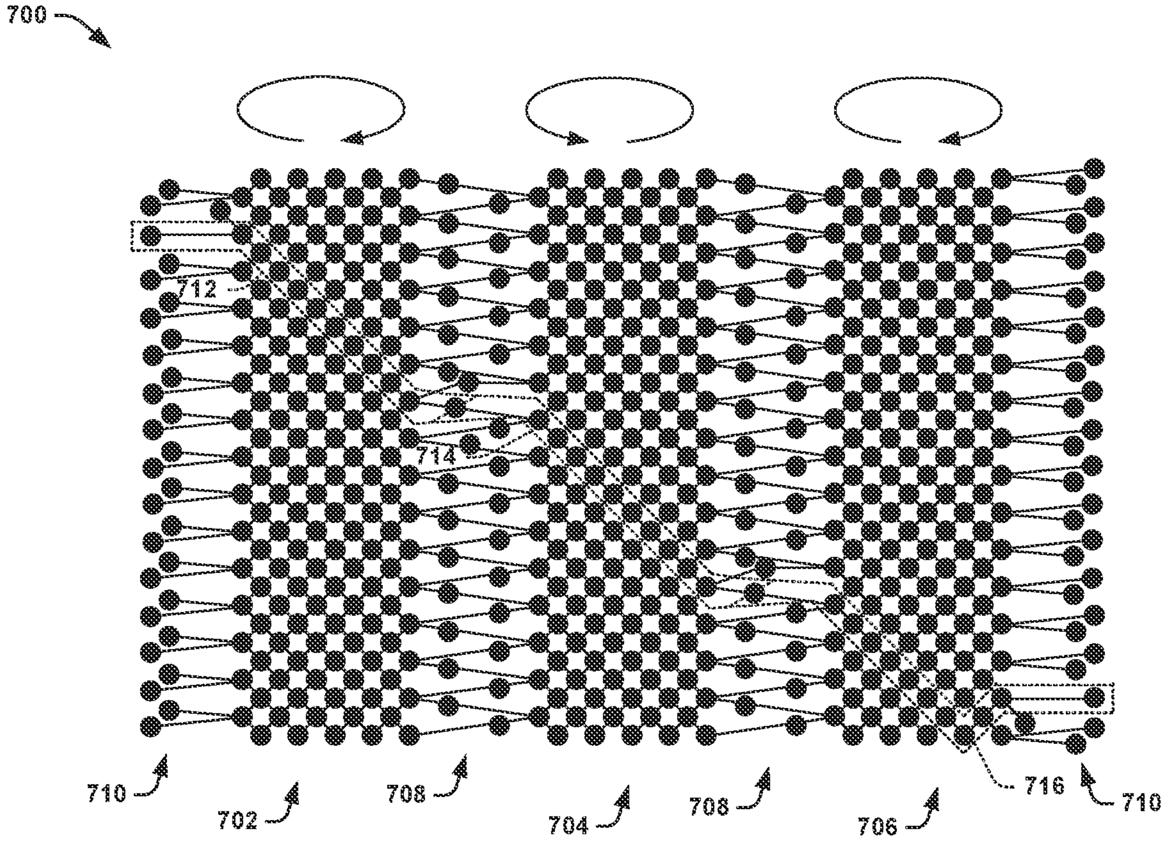
FIG. 7 illustrates another example of an Ising machine coupling network.

FIG. 7 illustrates another example of an Ising machine coupling network 700. The Ising machine coupling network 700 can correspond to an Ising machine coupling network that is a modified version of the Ising machine coupling network 600 in the example of FIG. 6. In the example of FIG. 7, the Ising machine coupling network 700 includes separate array portions 702, 704, and 706 that collectively correspond to at least a portion of an Ising machine. In the example of FIG. 7, the array portions 702, 704, and 706 are arranged in a one-dimensional array.

As an example, the Ising machine coupling network 700 can be formed by splitting up each of the ring oscillators in a large Ising machine, such as the Ising machine coupling network 600 in the example of FIG. 6, into a number of portions that are each included in one of the array portions, such as the array portions 702, 704, and 706. The ring oscillators in each array portion can thus be dedicated ring oscillators with return paths, with the connection to the ring oscillator in the next contiguous array portion being through an intermediate coupling stage 708. Thus, each of the ring oscillators in the large Ising machine coupling network, such as the Ising machine coupling network 600, can be split into separate ring oscillators.

Additionally, the Ising machine coupling network 700 includes additional coupling stages 710 at the ends of the array portions 702 and 706 that are uncoupled to any other ring oscillator. The intermediate coupling stages 708 and the additional coupling stages 710 are provided to balance operation of the individual ring oscillators that collectively form the equivalent of a larger ring oscillator (e.g., the ring oscillator 602). The intermediate coupling stages 708 thus correspond to a first coupling stage in the ring oscillator in both of the adjoining array portions, such as to include a return path to either the other intermediate coupling stage 708 (e.g., for the ring oscillators in the second array portion 704) or to the additional coupling stage 710 (e.g., for the ring oscillators in the first and third array portions 702 and 706).

In the example of FIG. 7, the ring oscillators of a given one of the array portions 702, 704, and 706 can propagate the respective oscillation signals in opposite directions relative to the ring oscillators of a next adjacent array portion. As demonstrated in the example of FIG. 7, the ring oscillators in the array portion 702 propagate the oscillation signal in a clockwise manner, the ring oscillators in the array portion 704 propagate the oscillation signal in a counter-clockwise manner, and the ring oscillators in the array portion 706 propagate the oscillation signal in a clockwise manner. Therefore, the oscillation signals of the ring oscillators in each of the array portions 702, 704, and 706 can interact with each other to provide a phase relationship between the ring oscillators in each of the array portions 702, 704, and 706. In this manner, a given one ring oscillator in each of the array portions 702, 704, and 706 can operate the same as one large ring oscillator across the entirety of a large Ising machine coupling network, but in a significantly shorter propagation time (e.g., approximately one-third the propagation time) than the respective oscillation signal of the large Ising machine coupling network.

In the example of FIG. 7, the Ising machine coupling network 700 includes a first ring oscillator 712 in the first array portion 702, a second ring oscillator 714 in the second array portion 704, and a third ring oscillator 716 in the third array portion 706. The ring oscillator 712 also includes one of the additional coupling stages 710 and one of the intermediate coupling stages 708, the ring oscillator 714 also includes two of the intermediate coupling stages 708, and the ring oscillator 716 also includes one of the additional coupling stages 710 and one of the intermediate coupling stages 708. In the example of FIG. 7, the intermediate coupling stages 708 are demonstrated as shared between adjacent array portions, such that a single one of the intermediate coupling stages 708 is included in both the first and second ring oscillators 712 and 714, and another single one of the intermediate coupling stages 708 is included in both the second and third ring oscillators 714 and 716, as indicated by the dotted lines that bound the ring oscillators 712, 714, and 716. The ring oscillators 712, 714, and 716 can therefore collectively correspond to the ring oscillator 602 in the example of FIG. 6.

The first ring oscillator 712 can propagate in the clockwise direction in the first array portion 702, the second ring oscillator 714 can propagate in the counter-clockwise direction in the second array portion 704, and the third ring oscillator 716 can propagate in the clockwise direction in the third array portion 706. Therefore, the first ring oscillator 712 can be cross-coupled to the second ring oscillator 714 via one of the intermediate coupling stage 708 and the second ring oscillator 714 can be cross-coupled to the third ring oscillator 716 via another one of the intermediate coupling stage 708. Accordingly, the ring oscillators 712, 714, and 716 can collectively correspond to the ring oscillator 602 that includes thirty coupling stages. However, because the ring oscillators 712, 714, and 716 each propagate respective oscillation signals to provide cross-coupling at each revolution, the ring oscillators 712, 714, and 716 can provide for phase relationships with the other ring oscillators of the Ising machine coupling network 700 in approximately one-third the time of the ring oscillator 602 in the Ising machine coupling network 600. Accordingly, the Ising machine coupling network 700 can provide for a more rapid and efficient Ising solution relative to the Ising machine coupling network 600.

Figure 8:
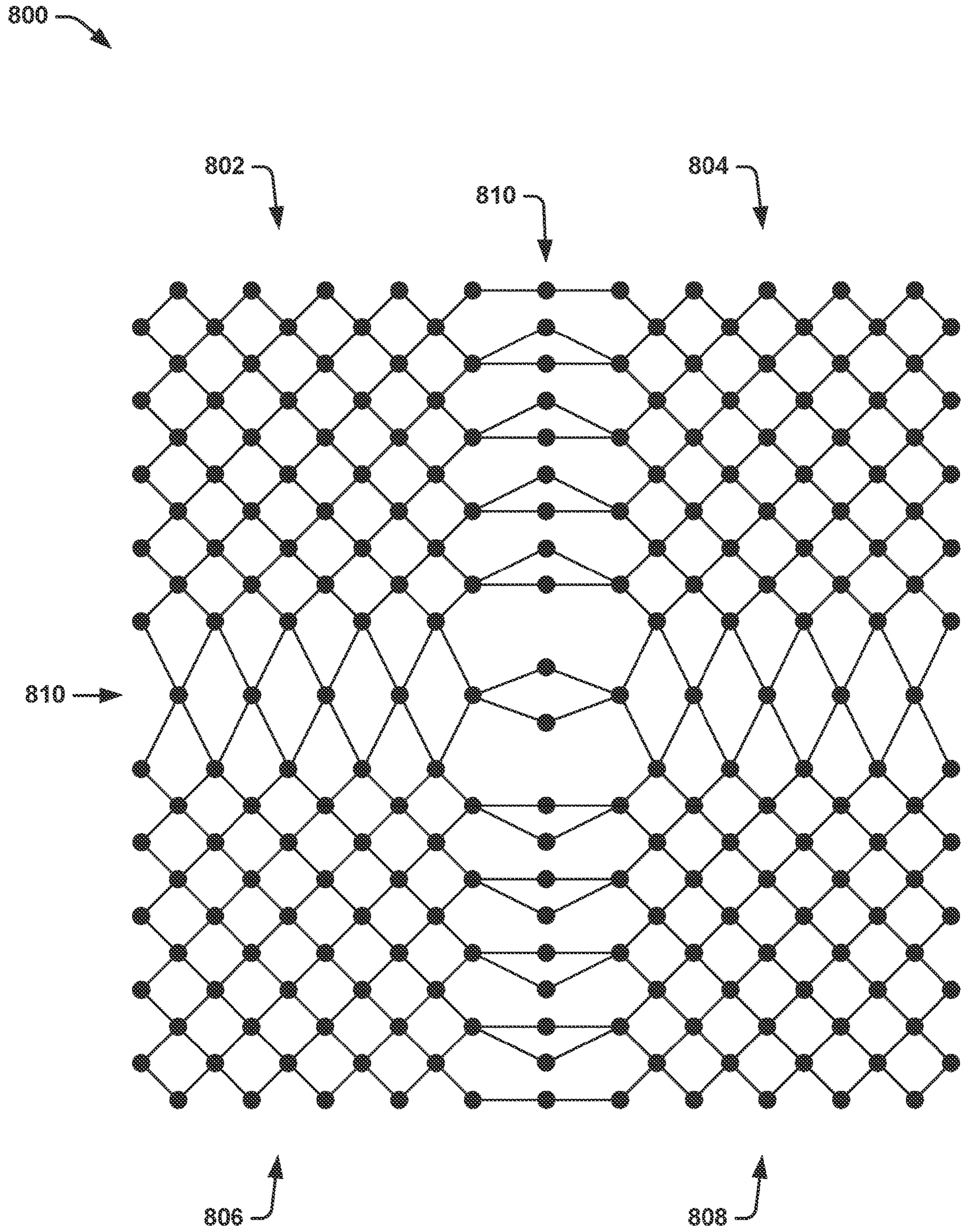
FIG. 8 illustrates another example of an Ising machine coupling network.

FIG. 8 illustrates another example of an Ising machine coupling network 800. The Ising machine coupling network 800 can correspond to a modified Ising machine coupling network, such as relative to the Ising machine coupling networks 600 and 700 in the respective examples of FIGS. 6 and 7. In the example of FIG. 8, the Ising machine coupling network 800 includes separate array portions 802, 804, 806, and 808 that collectively correspond to at least a portion an Ising machine. In the example of FIG. 8, the array portions 802, 804, and 806 are arranged in a two-dimensional array.

The Ising machine coupling network 800 can be formed by copying an Ising machine coupling network multiple times (e.g., the array portions 802, 804, 806, and 808) in an array that includes vertical and horizontal mirror-image symmetry. The ring oscillators in each array portion can thus be dedicated ring oscillators with return paths. However, each of the ring oscillators in a given one of the array portions 802, 804, 806, and 808 can be cross-coupled to one ring oscillator in at least one orthogonally adjacent array portion, as demonstrated by cross-couplings between the array portions 802, 804, 806, and 808 to intermediate coupling stages 810. The array portions 802, 804, 806, and 808 in the Ising machine coupling network 800 are demonstrated by example, and can include significantly more ring oscillators, coupling stages, and/or array portions than demonstrated in the example of FIG. 8.

The Ising machine coupling network 800 can operate as a different type of Ising machine architecture in which the Ising machine coupling network 800 operates as arrays of fully-connected portions with limited cross-coupling between the portions. As an example, an Ising machine coupling network arranged similar to the Ising machine coupling network 800 could have a 10×10 array of portions, with each portion including sixteen ring oscillators each. Therefore, the Ising machine coupling network would have one thousand six hundred oscillators, such that the Ising machine coupling network could implement one thousand six hundred unique variables. Each variable might thus connect to significantly fewer (e.g., only fifteen to eighteen) other variables. Accordingly, the Ising machine coupling network 800 represents an alternative to the Ising machine coupling network 700.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite “a,” “an,” “a first,” or “another” element, or the equivalent thereof, it should be interpreted to include one or more than one such element, neither requiring nor excluding two or more such elements. As used herein, the term “includes” means includes but not limited to, and the term “including” means including but not limited to. The term “based on” means based at least in part on.

What is claimed is:

1. An Ising machine system configured to solve an Ising problem, the Ising machine system comprising a plurality of ring oscillators that are each configured to propagate an oscillation signal, each of the ring oscillators comprises a plurality of coupling stages arranged in a two-dimensional array, each of the coupling stages having a unique phase index number within the respective one of the ring oscillators that matches the phase index numbers of the coupling stages of each of the other ring oscillators, each of the coupling stages excepting one fixedly uncoupled coupling stage of each of the ring oscillators is cross-coupled to a coupling stage having a same phase index number of one of the other ring oscillators via the oscillation signal associated with the respective ring oscillators, such that each of the ring oscillators is cross-coupled to each of the other ring oscillators at a single respective one of the coupling stages to provide a respective phase coupling between the respective cross-coupled ring oscillators, wherein the one excepted coupling stage of each of the ring oscillators occupies a position in the two-dimensional array at which no other one of the ring oscillators is physically present to provide a cross-coupling intersection, and the one excepted coupling stage is permanently uncoupled from every coupling stage of every other one of the ring oscillators.

2. The system of claim 1, wherein a propagation distance of the oscillation signal between a first coupling stage having a given phase index number and a second coupling stage having a next consecutive phase index number is equal for each of the ring oscillators.

3. The system of claim 1, wherein a Manhattan distance of each of the ring oscillators is equal to a Manhattan distance of each of the other ring oscillators.

4. The system of claim 1, wherein the coupling stages of a first one of the ring oscillators is fabricated in a linear physical arrangement along a first axis of the two-dimensional array, wherein the coupling stages associated with a second one of the ring oscillators are fabricated in a linear physical arrangement along a second axis of the two-dimensional array orthogonal with the first axis, wherein one of the coupling stages of the first one of the ring oscillators physically intersects one of the coupling stages of the second one of the ring oscillators having the same phase index number in the two-dimensional array.

5. The system of claim 4, wherein each of the remaining ring oscillators are fabricated in a physical L-shape, wherein one of the coupling stages of each of the ring oscillators physically intersects one of the coupling stages of each of the other ring oscillators having the same phase index number in the two-dimensional array.

6. The system of claim 5, wherein the coupling stage at a vertex of the physical L-shape of each of the remaining ring oscillators is uncoupled to any other coupling stage of any other of the ring oscillators.

7. The system of claim 4, wherein the two-dimensional array comprises a plurality of array portions, wherein each of the array portions comprises separate ring oscillators, wherein each of the ring oscillators in a first array portion is cross-coupled to one of the ring oscillators in a second array portion to provide phase coupling between the ring oscillators of the first array portion and the ring oscillators of the second array portion.

8. The system of claim 7, wherein the array portions are physically arranged in a one-dimensional array of the array portions, wherein the oscillation signal in each of the ring oscillators of one of the array portions propagates in an opposite orientation relative to the oscillation signal in each of the ring oscillators of a next contiguous array portion in the one-dimensional array of the array portions.

9. The system of claim 7, wherein the array portions are physically arranged in a two-dimensional array of the array portions, wherein each of the ring oscillators is cross-coupled via a coupling stage to one ring oscillator in each orthogonally adjacent array portion in the two-dimensional array of array portions.

10. The system of claim 1, further comprising an Ising machine controller configured to generate a plurality of control signals corresponding to parameters of the Ising problem to control the relative phase coupling of each of the ring oscillators to the other ring oscillators.

11. An Ising machine system configured to solve an Ising problem, the Ising machine system comprising a plurality of ring oscillators that are each configured to propagate an oscillation signal, each of the ring oscillators comprises a plurality of coupling stages arranged in a two-dimensional array, the coupling stages of a first one of the ring oscillators being fabricated in a linear physical arrangement along a first axis of the two-dimensional array, the coupling stages associated with a second one of the ring oscillators being fabricated in a linear physical arrangement along a second axis of the two-dimensional array orthogonal with the first axis, each of the remaining ring oscillators being fabricated in a physical L-shape, each of the coupling stages having a unique phase index number within the respective one of the ring oscillators that matches the phase index numbers of the coupling stages of each of the other ring oscillators, each of the coupling stages excepting one fixedly uncoupled coupling stage of each of the ring oscillators is cross-coupled to a coupling stage having a same phase index number of one of the other ring oscillators via the oscillation signal associated with the respective ring oscillators based on intersecting the other ring oscillators in the two-dimensional array, such that each of the ring oscillators is cross-coupled to each of the other ring oscillators at a single respective one of the coupling stages to provide a respective phase coupling between the respective cross-coupled ring oscillators, wherein the one excepted coupling stage of each of the ring oscillators occupies a position in the two-dimensional array at which no other one of the ring oscillators is physically present to provide a cross-coupling intersection, and the one excepted coupling stage is permanently uncoupled from every coupling stage of every other one of the ring oscillators.

12. The system of claim 11, wherein a propagation distance of the oscillation signal between a first coupling stage having a given phase index number and a second coupling stage having a next consecutive phase index number is equal for each of the ring oscillators.

13. The system of claim 11, wherein the coupling stage at a vertex of the physical L-shape of each of the remaining ring oscillators is uncoupled to any other coupling stage of any other of the ring oscillators.

14. The system of claim 11, wherein the two-dimensional array comprises a plurality of array portions, wherein a first array portion is linked to a second array portion to provide phase coupling between the ring oscillators of the first array portion and the ring oscillators of the second array portion based on a cross-coupling of a coupling stage of each of the ring oscillators of each of the first and second array portions.

15. An Ising machine system configured to solve an Ising problem, the Ising machine system comprising a plurality of ring oscillators that are each configured to propagate an oscillation signal, each of the ring oscillators comprises a plurality of coupling stages arranged in a two-dimensional array, each of the coupling stages having a unique phase index number within the respective one of the ring oscillators that matches the phase index numbers of the coupling stages of each of the other ring oscillators, each of the coupling stages excepting one fixedly uncoupled coupling stage of each of the ring oscillators is cross-coupled to a coupling stage having a same phase index number of one of the other ring oscillators, such that each of the ring oscillators is cross-coupled to each of the other ring oscillators at a single respective one of the coupling stages to provide a respective phase coupling between the respective cross-coupled ring oscillators, a propagation distance of the oscillation signal between a first coupling stage having a given phase index number and a second coupling stage having a next consecutive phase index number is equal for each of the ring oscillators, wherein the one excepted coupling stage of each of the ring oscillators occupies a position in the two-dimensional array at which no other one of the ring oscillators is physically present to provide a cross-coupling intersection, and the one excepted coupling stage is permanently uncoupled from every coupling stage of every other one of the ring oscillators.

16. The system of claim 15, wherein the coupling stages of the ring oscillators are fabricated in a linear physical arrangement along a first axis of the two-dimensional array, wherein the coupling stages associated with a second one of the ring oscillators are fabricated in a linear physical arrangement along a second axis of the two-dimensional array orthogonal with the first axis, wherein one of the coupling stages of the first one of the ring oscillators physically intersects one of the coupling stages of the second one of the ring oscillators having the same phase index number in the two-dimensional array.

17. The system of claim 16, wherein each of the remaining ring oscillators are fabricated in a physical L-shape, wherein one of the coupling stages of each of the ring oscillators physically intersects one of the coupling stages of each of the other ring oscillators having the same phase index number in the two-dimensional array.

18. The system of claim 17, wherein the coupling stage at a vertex of the physical L-shape of each of the remaining ring oscillators is uncoupled to any other coupling stage of any other of the ring oscillators.

19. The system of claim 16, wherein the two-dimensional array comprises a plurality of array portions, wherein a first array portion is linked to a second array portion to provide phase coupling between the ring oscillators of the first array portion and the ring oscillators of the second array portion based on a cross-coupling of a coupling stage of each of the ring oscillators of each of the first and second array portions.

* * * * *